Figure 1:
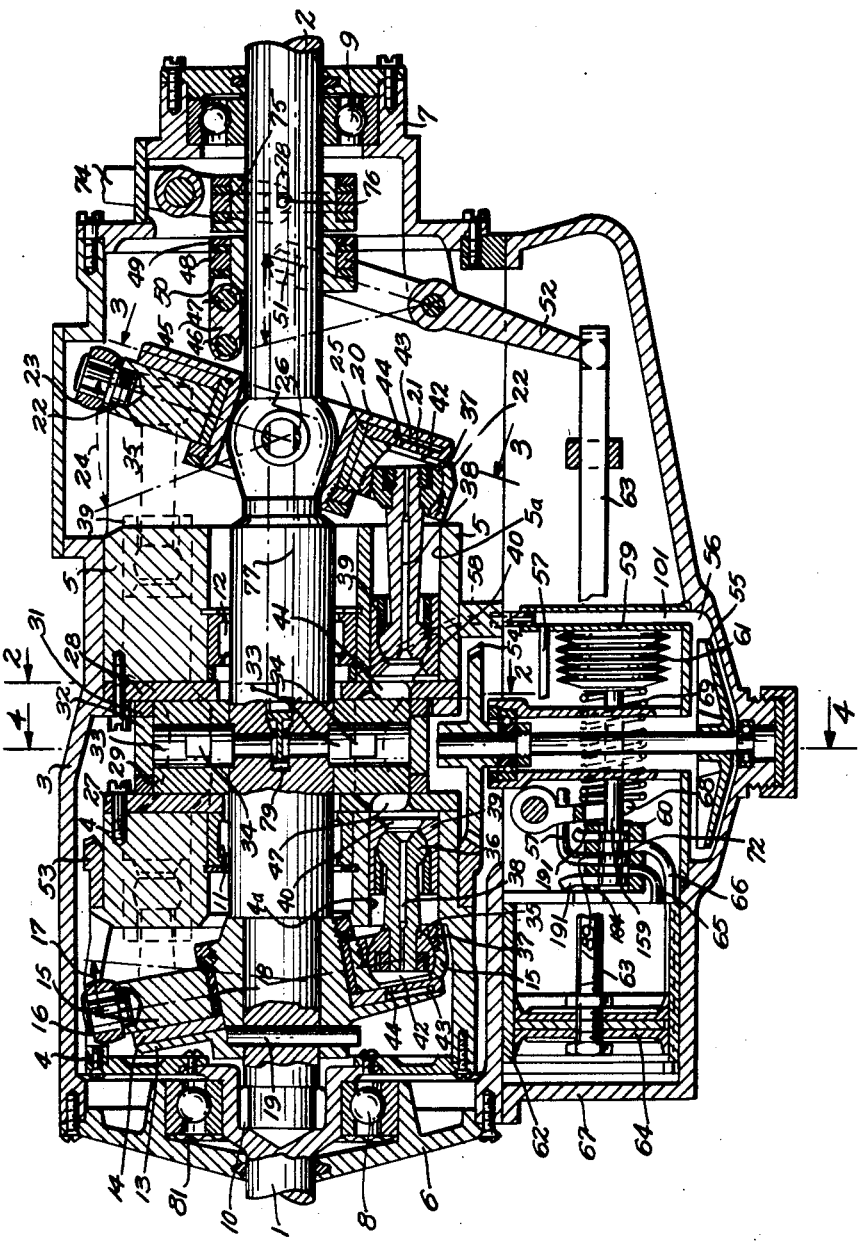

Dec. 2, 1958   K. BAUER   2,862,456
ROTARY, WOBBLE PLATE TYPE PUMP OR MOTOR
Original Filed Oct. 19, 1950   2 Sheets-Sheet 1

INVENTOR
Karl Bauer
BY Michael S. Striker
ATTORNEY

Dec. 2, 1958   K. BAUER   2,862,456
ROTARY, WOBBLE PLATE TYPE PUMP OR MOTOR
Original Filed Oct. 19, 1950   2 Sheets-Sheet 2

INVENTOR
Karl Bauer
BY Michael S. Striker
ATTORNEY

United States Patent Office 2,862,456
Patented Dec. 2, 1958

2,862,456

ROTARY, WOBBLE PLATE TYPE PUMP
OR MOTOR

Karl Bauer, Nurnberg-Laufamholz, Germany

Continuation of application Serial No. 190,942, October 19, 1950. This application February 17, 1955, Serial No. 488,898

Claims priority, application Germany October 19, 1949

7 Claims. (Cl. 103—162)

This invention relates to a hydraulic transmission; and this application is a continuation of my co-pending application Serial No. 190,942 dated October 19, 1950 now abandoned.

More particularly the invention relates to a hydraulic transmission of the type in which the driven shaft is journalled at one end in the drive shaft, the shafts being coaxial and are mechanically coupled when the speed ratio is 1:1 and no pumping action takes place. The invention relates particularly to a transmission of this kind in which the hydraulic motor is secured to a stationary, that is, non-rotary housing and the hydraulic motor and the hydraulic pump are designed to impart forward and reverse directions of operation to the driven shaft.

It is an object of the present invention to provide a structure in which the hydraulic effective forces compensate each other, since the sum of the piston cross-sections (equal number and equal diameter) in the hydraulic pump and hydraulic motor are of equal magnitude, and the hydraulic forces, owing to the opposing arrangement of the hydraulic pump and the hydraulic motor, also operate in opposite directions and therefore produce substantially a tensional stress in the driven shaft between their points of action on wobble plates. A further object of the invention resides in the transmission of the effective hydraulic forces to the wobble plates which is effected by direct hydraulic action on these plates from the hydraulic pressure in the cylinder chambers acting through bores in the connecting rods which lead to pressure pockets at the outer ends of the rods. The effective cross sectional area in each chamber is approximately equal to the associated piston area, and these pressure pockets are effective on the wobble plates. To keep down friction between the connecting rod end bearing rings and the wobble plates, an intermediate bearing disc or plate is inserted between each of said members and is formed with hydraulic pressure spaces adjacent the wobble plates, the sum of the areas of which correspond to the sum of the piston areas, and the pressure spaces are connected by passages to the hydraulic pressure pockets on the connecting rod and bearing rings and thus with the cylinders. The pressure pockets and pressure spaces effective on the wobble plates and intermediate bearing plates, relieve the ball head of the connecting rod from the acting piston pressure since the effective cross-section on the ball head in the said end bearing ring is equal to the piston area. Moreover the cylinder head pressure is relieved by means of a rotary control valve plate between the two cylinder end plates of the hydraulic pump and the hydraulic motor, and the hydraulic effective forces in the direction from the control means to the remaining parts of the cylinder end plates are approximately equal to the effective hydraulic forces on the cylinder end plates in the direction from the cylinders.

Figure 2:
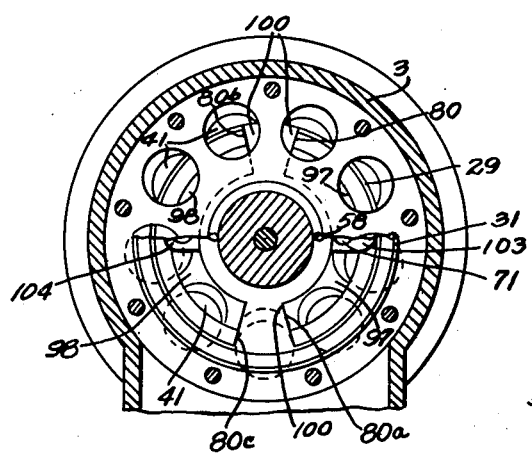
Figure 4:
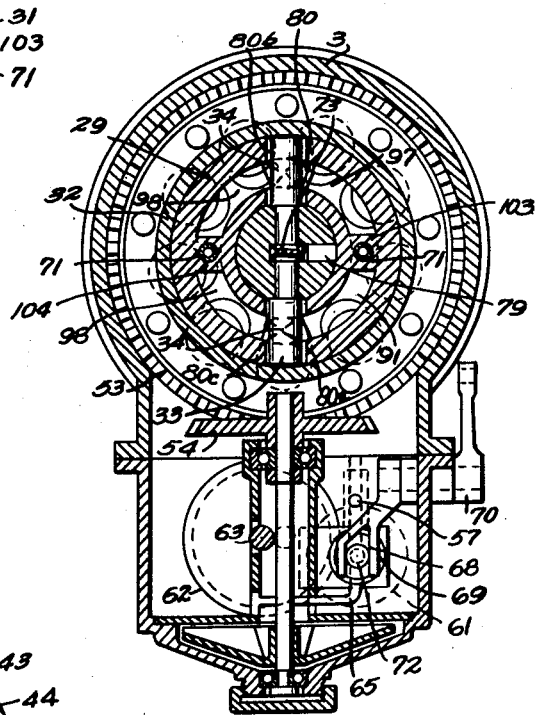
Figure 3:
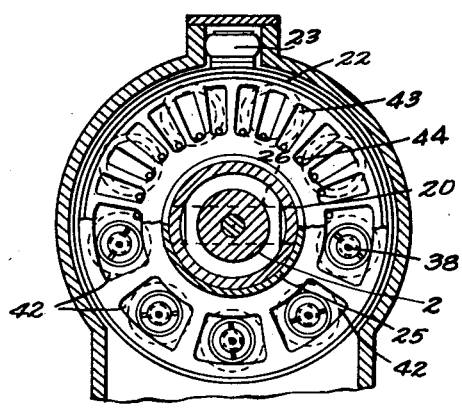

The drawings illustrate the hydraulic transmission in a preferred form in which:

Figure 1 is a longitudinal sectional view of the transmission,
Figure 2 is a cross section taken on line II—II of Fig. 1,
Figure 3 is a cross section taken on line III—III of Fig. 1, and
Figure 4 is a cross section taken on line IV—IV of Fig. 1.

The drive shaft 1 which is journalled in ball bearings 8 in a supporting means, shown to be a cover plate 6 drives a pump rotor 4 and also by means of a coupling roller 16 guided in a track 17 parallel to the shaft, actuates an end bearing ring member 15 which is part of the pump assembly. The end bearing ring member 15 thus rotates at the same speed as the pump rotor 4 and the driving shaft 1. A wobble plate 13 is mounted on the shaft 2 and rotates at the same speed as a driven shaft 2 thereby producing an oscillation of the end bearing ring 15, the frequency of which oscillation corresponds to the difference between the speed of the drive shaft 1 and that of the driven shaft 2. Since this speed difference may be large, the bearing ring 15 is journalled by means of a bushing 18 on the wobble plate 13 and further the space between the ring 15 and the wobble plate 13 is filled by an intermediate bearing disc or plate 14 which is exposed on both sides to the hydraulic medium and serves as a friction reducing means. The wobble plate 13 is fixed by means of a transverse key or pin 19 on the driven shaft 2, both against rotation and sliding movement. The driven shaft 2 is journalled in the driving shaft 1 by means of a bearing ring 10 which is in the same plane with the ball bearing 8, and the pump rotor 4 is also journalled in a bearing ring 11 on the driven shaft 2. The motor stator 5 is a cylinder block mounted in a supporting means 3 and attached by screws thereto. An end bearing ring member 22 for the motor stator 5 is held by means of an abutment roller 23 moving along an arc in a slot 24 parallel to the shafts. The roller 23 is guided in a track 24 in the supporting means 3. The bearing ring member 22 thus does not rotate, but according to the position of the wobble plate 20 which is connected to shaft 2 for rotation therewith, it performs a reciprocation of greater or lesser magnitude and the frequence of the reciprocation of the ring 22 and consequently the number of strokes of the associated pistons 39 thus corresponds to the rotational speed of the driven shaft 2. If the wobble plate 20 is set at right angles to the driving shaft 2, then the oscillation of the bearing ring becomes zero as does also the length of the stroke of the pistons 39. This is the position of direct drive in which no motion of operating fluid in the piston spaces, that is in the cylinder chambers 40, can take place, so that only mechanical coupling action prevails.

Since the relative speed of the bearing disc 22 with respect to the wobble plate 20 can become very high, there is inserted in axial direction, between the said disc 22 and the plate 20 and facing them by its front faces, an intermediate bearing or floating disc 21 which subdivides the relative surface speed of engaging members. A further intermediate bearing ring 25 serves the same purpose to subdivide the relative surface of engaging members speed between the hubs of the parts 20 and 22. The wobble plate 20 is held against rotation relatively to the driven shaft 2 by a cross bolt 26 which, however, permits rocking of the wobble plate. The driven shaft 2 is journalled by means of ball bearings 9 in a supporting means shown to be a cover plate 7 on the motor end of supporting means 3, and a journal bearing 12 in the motor stator 5 serves to further support the driven shaft 2. The driven shaft 2 is integral throughout and extends from the journal bearing 10 in the plane of the bearing 8 back to the cover plate 7. Supporting means 6, 3 and 7 form, together with the bottom part 67, the casing of the machine. The driven shaft 2 is preferably made in one piece in order to support the tension, twisting and bending stresses to which it is subjected. Also, shaft 2 is supported by the journal bearing 12 in the motor stator 5 which is secured in the supporting means 3, thus supporting shaft 2 laterally against oscillation. The pump rotor 4 has a cylinder head end plate 27, and the motor stator 5 has a similar end plate 28. The end plates 27 and 28 have ports 41 through which the oil flows into and out of two arcuate transverse ports or sickle-shaped openings 97, 98 of a valve plate member 29 whereby the suction and pressure sides of the cylinders 40 and the passages of the pistons 39 are supplied with oil. The valve plate 29 has control edges 80, 80a, 80b, 80c which limit the arcuate transverse ports 97, 98 and open and close the ports 41 in the required cycle, since the dead center positions of the wobble plates 13 and 20 and of the valve plate 29 are always synchronized, and the masking surfaces 100 of the valve plate 29 bounded by the edges 80, 80a, 80b, 80c correspond to the breadth of the ports 41 in the cylinder end plates 27 and 28. In order to maintain the friction surfaces and the sealing surfaces of the valve plate 29 small with respect to the cylinder end plates 27 and 28, the walls of ports 41 are inclined in such a manner that they lead from the outwardly arranged hydraulic working chambers 40 to the inwardly arranged arcuate transverse ports 97, 98 in order to reduce the relative speed at the outer circumference of the valve plate 29. Working chambers 40 are formed in cylinder bores 4a between the recessed front faces of pistons 39 and plate 27, and in the cylinder bores 5a between the recessed front faces of pistons 39 and plate 28. Also, intermediate speed sealing rings 30 and 31 are provided, separated from each other by a distance or spacing ring 32. The sum of the hydraulic forces exerted on the semi-circular portions of the cylinder head end plates 27, 28 by the hydraulic pressure in the hydraulic working chambers 40 is slightly greater than the sum of the hydraulic forces which act upon the bridge portions of the cylinder head and the other wall portions of the rotor and stator so that the valve plate 29 operates with minimum surface pressure and therefore with minimum friction against the cylinder end plates 27 and 28. The ring 32 prevents the coupling valve plugs 33 from being impelled outwardly by centrifugal force. These valve plugs or cocks 33 have ports 34 and in the position shown in Fig. 1, the ports 34 connect the (pressure) arcuate transverse port 97 with the (suction) arcuate transverse port 98 in the valve plate 29. The illustrated position thus corresponds to the condition in which the hydraulic coupling between pump rotor 4 and motor stator 5 is ineffective.

The connecting rod 35 has a ball head 36 at the piston end and a ball head 37 at the ring end. A conduit in the form of a bore 38 in the connecting rod 35 provides communication between the hydraulic working chamber 40 and the hydraulic pressure pockets 42 in rings 15 and 22. The hydraulic pressure pockets 42, Fig. 3, are connected by means of small passages 44 with the hydraulic pressure spaces 43 in the bearing discs 14 and 22, and any three hydraulic pressure spaces 43 in the intermediate bearing discs 14 and 21 have their active total surfaces as large as the cross section of any pressure pockets 42 in the rings 15 and 22. Each hydraulic pressure space 43 may be larger if desired but the sum of their cross-sectional areas must be nearly equal to that of the cross-sectional area of all the pistons. Similarly the sum of all the cross-sectional areas of the hydraulic pressure pockets 42, Fig. 3, must also be nearly equal to the sum of the cross sections of the pistons. The surfaces of contact between the connecting rod bearing rings 15, 22 and the intermediate bearing discs 14, 21, and between the latter and the wobble plates 13, 20 are in this way practically relieved of pressure, and thus friction is therefore reduced to a minimum.

A coupling link 45, by means of connecting pins 46 and 47, mechanically connects the wobble plate 20 with a shifting ring 49. The shifting ring 49 rotates along with the driven shaft 2, while a shifting ring 48 remains stationary. Between the shifting ring 48 and the shifting ring 49 there are arranged intermediate speed rings 50 which subdivide the sliding speed. Pins 51 on the shifting ring 48 engage a fork lever 52 for the actuation of the wobble plate 20. The pump block or rotor 4 has attached thereto a bevel gear 53 rotating therewith at the drive or input speed and this bevel gear 53 meshes with a bevel gear 54 driving a flywheel 55 of a centrifugal pump. A pressure chamber 56 of the centrifugal pump communicates by means of a conduit 101 (Fig. 1) and a connecting duct 57 with a control block or valve 60, and through a connecting duct 58, with make-up check valves 71 in the valve plate 29, and also by means of a connecting passage 59 with the interior of a bellows-type diaphragm 61. The casing 184 of the valve 60 is formed with an inlet port 189 connected to conduit pipe 57 and to exhaust ports 191 communicating (not shown) with the suction side of the centrifugal pump 55. A reciprocable valve member 72 is connected by a stem 159 to the left-hand side of the diaphragm 61. The reciprocable valve member 72 closes in its intermediate position as shown, two outlet openings 65, 66 leading to the opposite front sides of a piston 64 guided within the cylinder 62. When the driving speed increases or diminishes as the torque on the driven shaft varies, the speed of the input or driving shaft 1 will also vary and simultaneously the pressure in the pressure chamber 56 of the centrifugal pump will vary, so that the pressure variation will alter the length of the diaphragm 61 (a bellows, or corrugated tube) and thus the position of the control slide 72 with respect to the inlet opening 189 and outlet openings 65, 66 of the control valve 60. The oil flowing through the connecting ducts 101, 57, according to the position of the control slide 72, will flow through the openings 65 or 66 to the right or left-hand side of the piston 64 in the control cylinder 62 thereby moving the piston 64 to the left or to the right, so that the piston movement through the piston rod 63 and the fork lever 52 varies the inclination of the wobble plate 20 and thus controls the transmission ratio as required by the desired torque at the driven shaft, depending on the input torque and the input speed. To hold the driving speed within prescribed or permissible limits, or to vary the driven speed, a compression spring 69 is provided acting counter to the pressure in the diaphragm 61. The compression in the spring 69 can be adjusted by any suitable means. In the drawing this is accomplished by mechanical means and by a selector lever 70 which can be set to the desired driving speed and which actuates the fork lever 68 to adjust the spring 69 to the desired tension.

The centrifugal pump and the control assembly are arranged in the bottom part or oil sump 67 of the casing to which the suction side of the centrifugal pump is connected and in which an oil sump is provided. The controlling mechanism should not be over or undercontrolled and should have sufficient damping and if necessary a restoring means. To prevent disturbances due to air inclusions or oil vapor, at the places where air locks may occur, for example, at the inner diameter of the axial conduit of the rotating valve plate 29, suitable vents or leak passages 99 may be provided.

To actuate the valve plug 33 in the control valve plate member 29 a coupling lever 74 may be rocked about 15° to the left, Fig. 1, thereby shifting the slide sleeve 75 for the coupling operation to the right to such an extent permissible by a pin 76 in a slot 78. By this means a thrust rod 77 is shifted to the right in its central bore in the driven shaft 2 by an amount such that segments guided in a guide slot 79 and nonrotatably attached to the valve plug 33, are rotated 90° about the axis of the valve, thereby interrupting communication between the pressure side and the suction side in the valve plate 29 through the bores 34. In this position the transmission is engaged.

A spring disc 81 inserted between the bearing plate 6 and the ball bearing 8, urges the pump rotor 4 against the valve plate 29 and the latter against the motor stator 5 thereby fixing the driven shaft 2 in its longitudinal position in the housing 3.

Similarly in the manner in which the wobble plate 20 is displaceably mounted on the driven shaft 2 by the cross bolt 26, the wobble plate 13 is arranged so that starting with zero driving torque can take place. The actuation of a wobble plate disc which can be displaced in this manner may be similar to that for the wobble plate 20. It can also be brought into dependency on the oblique position of the plate 20 by providing mechanical rod connections arranged in a longitudinal bore in the driven shaft 2. The non-displaceable wobble plate 13 can be dynamically weighted to effect dynamic balance of the displaceable wobble plate 20 for which purpose a further plate displaceable in direction opposite thereto may be provided, which for sake of simplicity of showing is not illustrated on the drawing.

I claim:

1. In a fluid translating device having a cylinder block with a plurality of bores therein and a piston for each bore with a piston rod for each piston and having a bore extending through the rod, said pistons and piston rods being reciprocable relative to the block, said device also having a valve plate and wobble plate mounted for joint rotation and a bearing ring for the wobble plate to receive the outer ends of the piston rods; a friction reducing means comprising a bearing disc provided between the bearing ring and the wobble plate and having passages therethrough, said bearing ring and wobble plate forming fluid pressure pockets and pressure spaces on opposite sides of the bearing disc, said pockets and spaces communicating with each other by said passages so that the pressure of the fluid in the piston rods will be communicated to the pressure spaces and pockets on opposite sides of the bearing disc.

2. A friction reducing means for a bearing ring carrying the ends of perforated piston rods and a wobble plate of a fluid translating device, comprising a disc between the wobble plate and the end of the piston rods in the bearing ring and forming pressure spaces between one side of the disc and the wobble plate and pressure pockets between the other side of the disc and the end of each piston rod with communication through passages in the disc so that the fluid pressure in the perforated piston rod will be communicated on both sides of the disc in the pressure pockets and the pressure spaces.

3. In a fluid translating device having a cylinder block with a plurality of bores therein and a piston for each bore with a piston rod for each piston and having a bore extending through the rod, said pistons and piston rods being reciprocable relative to the block, said device also having a valve plate and wobble plate mounted for joint rotation and a bearing ring for the wobble plate to receive the outer ends of the piston rods; a friction reducing means comprising an intermediate bearing disc provided between the bearing ring and the wobble plate and having a plurality of passages therethrough, said bearing ring and wobble plate forming fluid pressure spaces and pressure pockets on opposite sides of the bearing disc, the axially opposed pockets and spaces being connected to each other by the passages so that the pressure of the fluid in the piston rods will be communicated to the pressure spaces and pockets on opposite sides of the bearing disc, the effective cross sections of the pressure pockets and the pressure spaces being equal to each other.

4. In a fluid translating device having a cylinder block with a plurality of bores therein and a piston for each bore with a piston rod for each piston and having a bore extending through the rod, said pistons and piston rods being reciprocable relative to the block, said device also having a valve plate and wobble plate mounted for joint rotation and a bearing ring for the wobble plate to receive the outer ends of the piston rods; a friction reducing means comprising an intermediate bearing disc provided between the bearing ring and the wobble plate and having a plurality of passages therethrough, said bearing ring and wobble plate forming fluid pressure pockets and pressure spaces on opposite sides of the bearing disc, said pockets and spaces being connected to each other by the passages so that the pressure of the fluid in the piston rods will be communicated to the pressure pockets and spaces on opposite sides of the bearing disc, the effective cross sections of the pressure pockets and of the pressure spaces being equal to each other and to the sum of the cross sections of the pistons.

5. In a fluid translating device having a cylinder block with a plurality of cylinder bores therein and a piston for each cylinder bore with a piston rod for each piston and having a conduit extending through said piston rod, said pistons and piston rods being reciprocable relative to said cylinder block, said pistons forming in said cylinder bores hydraulic working chambers communicating through said conduits with the outer ends of said piston rods, said device also having a wobble plate mounted for rotation and a bearing ring for said wobble plate and receiving said outer ends of said piston rods; a supporting means supporting said cylinder block; and a bearing disc located between said bearing ring and said wobble plate and having passages therethrough, said bearing ring and said wobble plate forming fluid pressure pockets and pressure spaces on opposite sides of said bearing disc, said pockets and spaces communicating with each other through said passages, and said pressure pockets communicating with said conduits in said piston rods, respectively, so that the pressure of a fluid in said hydraulic working chambers is communicated to said pressure spaces and pockets on opposite sides of said bearing disc.

6. In a pump device having a rotary pump cylinder block with a plurality of cylinder bores therein and a piston for each cylinder bore with a piston rod for each piston and having a conduit extending through said piston rod, said pistons and piston rods being reciprocable relative to said cylinder block, said pistons forming in said cylinder bores hydraulic working chambers communicating through said conduits with the outer ends of said piston rods, said device also having a wobble plate mounted for rotation and a bearing ring for said wobble plate and receiving said outer ends of said piston rods; a supporting means supporting said cylinder block for rotation; and a bearing disc located between said bearing ring and said wobble plate and having passages therethrough, said bearing ring and said wobble plate forming fluid pressure pockets and pressure spaces on opposite sides of said bearing disc, said pockets and spaces communicating with each other through said passages, and said pressure pockets communicating with said conduits in said piston rods, respectively, so that the pressure of a fluid in said hydraulic working chambers is communicated to said pressure spaces and pockets on opposite sides of said bearing disc.

7. In a hydraulic motor device having a non-rotatable cylinder block with a plurality of cylinder bores therein and a piston for each cylinder bore with a piston rod for each piston and having a conduit extending through said piston rod, said pistons and piston rods being reciprocable relative to said cylinder block, said pistons forming in said cylinder bores hydraulic working chambers communicating through said conduits with the outer ends of said piston rods, said device also having a wobble plate mounted for rotation and a bearing ring for said wobble plate and receiving said outer ends of said piston rods; a supporting means stationarily supporting said cylinder block; and a bearing disc located between said bearing ring and said wobble plate and having passages therethrough, said bearing ring and said wobble plate forming fluid pressure pockets and pressure spaces on opposite sides of said bearing disc, said pockets and spaces communicating with each other through said passages, and said pressure pockets communicating with said conduits in said piston rods, respectively, so that the pressure of a fluid in said hydraulic working chambers is communicated to said pressure spaces and pockets on opposite sides of said bearing disc.

References Cited in the file of this patent

UNITED STATES PATENTS

| | | |
|---|---|---|
| 1,722,832 | West | July 30, 1929 |
| 1,726,454 | Rayburn et al. | Aug. 27, 1929 |
| 1,840,873 | Rayburn | Jan. 12, 1932 |
| 2,114,076 | Golz | Apr. 12, 1938 |
| 2,151,415 | Bennetch | Mar. 12, 1939 |
| 2,241,701 | Doe | May 13, 1941 |
| 2,360,025 | Wahlmark | Oct. 10, 1944 |